(12) United States Patent
Iigahama et al.

(10) Patent No.: US 10,423,057 B2
(45) Date of Patent: Sep. 24, 2019

(54) PROJECTION APPARATUS, PROJECTION SYSTEM AND SPECTACLE-TYPE DISPLAY APPARATUS

(71) Applicant: ColorLink Japan, Ltd., Niigata (JP)

(72) Inventors: Yukio Iigahama, Hyogo (JP); Masayuki Sasagawa, Chiba (JP)

(73) Assignee: ColorLink Japan, Ltd., Niigata (JP)

( * ) Notice: Subject to any disclaimer, the term of this patent is extended or adjusted under 35 U.S.C. 154(b) by 0 days.

(21) Appl. No.: 16/150,281

(22) Filed: Oct. 3, 2018

(65) Prior Publication Data

US 2019/0033699 A1    Jan. 31, 2019

Related U.S. Application Data

(63) Continuation of application No. PCT/JP2016/061743, filed on Apr. 11, 2016.

(51) Int. Cl.
*G03B 21/28* (2006.01)
*G02B 5/30* (2006.01)
(Continued)

(52) U.S. Cl.
CPC ........... *G03B 21/28* (2013.01); *G02B 5/3025* (2013.01); *G02B 6/0056* (2013.01);
(Continued)

(58) Field of Classification Search
CPC ...... G03B 21/28; G03B 21/14; G02B 5/3025; G02B 6/0056; G02B 27/0172; G02B 27/26; G02B 5/30
See application file for complete search history.

(56) References Cited

U.S. PATENT DOCUMENTS

| 5,526,184 A | 6/1996 | Tokuhashi |
| 5,943,171 A | 8/1999 | Budd |

(Continued)

FOREIGN PATENT DOCUMENTS

| JP | H0659217 A | 3/1994 |
| JP | H0990312 A | 4/1997 |

(Continued)

OTHER PUBLICATIONS

International Preliminary Report on Patentability for International Application No. PCT/JP2016/061743, issued by the International Bureau of WIPO dated Oct. 11, 2018.

(Continued)

*Primary Examiner* — Ryan D Howard (57) ABSTRACT

A projection system is provided, including: a projection unit to output a projection image; a retardation plate arranged obliquely with respect to an optical axis of the projection image, the retardation plate to modulate a polarization state of the projection image incident thereon; a reflective polarizing plate stacked on a side of the retardation plate opposite to that on which the projection image is incident, the reflective polarizing plate to reflect a first polarization component of the projection image transmitted through the retardation plate; and a retro-reflective element provided along a direction in which the projection image is reflected by the reflective polarizing plate, the retro-reflective element to output reflected light against a direction in which the light is incident, wherein the reflective polarizing plate transmits a second polarization component of the projection image reflected by the retro-reflective element and modulated by the retardation plate.

20 Claims, 7 Drawing Sheets

(51) Int. Cl.
    *G02B 27/26* (2006.01)
    *G03B 21/14* (2006.01)
    *F21V 8/00* (2006.01)
    *G02B 27/01* (2006.01)

(52) U.S. Cl.
    CPC ......... *G02B 27/0172* (2013.01); *G02B 27/26* (2013.01); *G03B 21/14* (2013.01)

(56) References Cited

U.S. PATENT DOCUMENTS

| | | | |
|---|---|---|---|
| 5,949,583 A | 9/1999 | Rallison | |
| 6,341,869 B1 | 1/2002 | Inami | |
| 2002/0041446 A1 | 4/2002 | Nagaoka | |
| 2010/0014053 A1* | 1/2010 | Brentnall, III | G02B 27/2292 353/7 |
| 2015/0248014 A1 | 9/2015 | Powell | |
| 2017/0261759 A1 | 9/2017 | Yamamoto | |

FOREIGN PATENT DOCUMENTS

| | | |
|---|---|---|
| JP | H10232365 A | 9/1998 |
| JP | H1195160 A | 4/1999 |
| JP | 2004205858 A | 7/2004 |

OTHER PUBLICATIONS

S. Tachi, "Telexistence and Retro-relective Projection Technology (RPT)", Proceedings of the 5th Virtual Reality International Conference (VRIC2003) pp. 69/1-69/9, Laval Virtual 2003, France, May 13-18, 2003.

International Search Report for International Patent Application No. PCT/JP2016/061743, issued by the Japan Patent Office dated Jun. 28, 2016.

Explanation of circumstances concerning early examination in reference to Application No. PCT/JP2016/061743 filed on Jun. 13, 2017.

* cited by examiner

PROJECTION APPARATUS, PROJECTION SYSTEM AND SPECTACLE-TYPE DISPLAY APPARATUS

The contents of the following Japanese patent application(s) are incorporated herein by reference:
No. PCT/JP2016/061743 filed on Apr. 11, 2016.

BACKGROUND

1. Technical Field

The present invention relates to a projection apparatus, a projection system and a spectacle-type display apparatus.

2. Related Art

Retro-reflective projection technology has been known, in which a virtual object is displayed by projecting a video image from a projector onto a retro-reflective element via a half mirror (see Non-Patent Document 1 and Patent Document 1).
Image displaying apparatuses using a polarizing beam splitter has also been known (see Patent Documents 2 and 3).
Non-Patent Document 1: S. Tachi, Telexistence and Retro-reflective Projection Technology (RPT), Proceedings of the 5th Virtual Reality International Conference (VRIC2003) pp. 69/1-69/9, Laval Virtual 2003, France, May 13-18, 2003
Patent Document 1: Japanese Patent Application Publication No. 2000-122176
Patent Document 2: Japanese Patent Application Publication No. Hei. 6-342129
Patent Document 3: Japanese Patent Application Publication No. Hei. 6-59217

However, with the conventional method, the video image from the projector reaches an observer after being weakened by the half mirror, and therefore the displayed video image has low brightness due to large loss of video image light. To provide a bright video image for the observer, a large-scale projector has been required.

SUMMARY

A first aspect of the present invention provides a projection system including: a projection unit to output a projection image; a retardation plate arranged obliquely with respect to an optical axis of the projection image, the retardation plate to modulate a polarization state of the projection image incident thereon; a reflective polarizing plate stacked on a side of the retardation plate opposite to that on which the projection image is incident, the reflective polarizing plate to reflect a first polarization component of the projection image transmitted through the retardation plate; and a retro-reflective element provided along a direction in which the projection image is reflected by the reflective polarizing plate, the retro-reflective element to output reflected light against a direction in which the light is incident, wherein the reflective polarizing plate transmits a second polarization component of the projection image reflected by the retro-reflective element and modulated by the retardation plate.

A second aspect of the present invention provides a projection apparatus including: a projection unit to output a projection image; a retardation plate arranged obliquely with respect to an optical axis of the projection image, the retardation plate to modulate a polarization state of the projection image incident thereon; and a reflective polarizing plate stacked on a side of the retardation plate opposite to that on which the projection image is incident, the reflective polarizing plate to reflect a first polarization component of the projection image transmitted through the retardation plate for projection on a retro-reflective element provided forward, wherein the reflective polarizing plate transmits a second polarization component of the projection image reflected by the retro-reflective element and modulated by the retardation plate.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
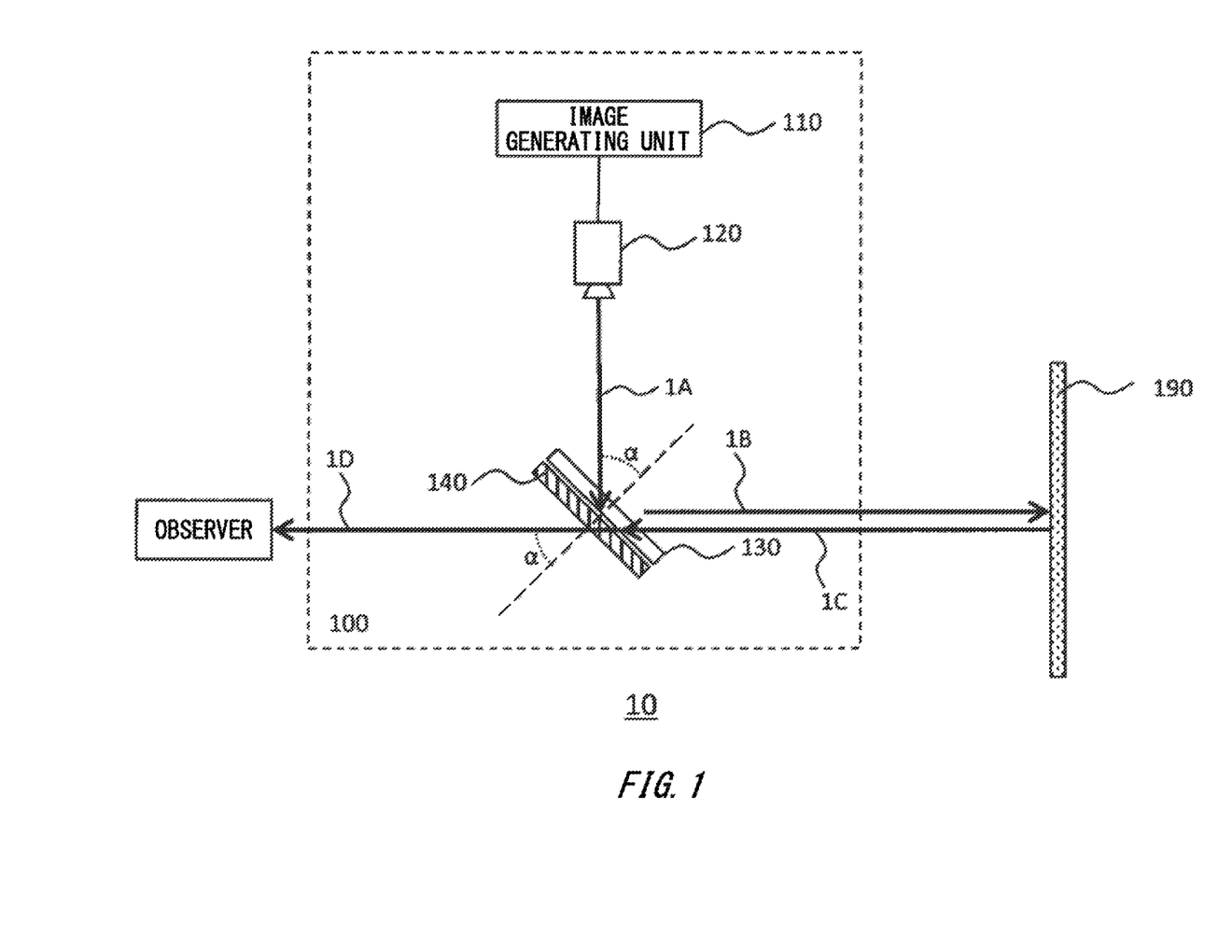
FIG. 1 shows an example of a projection system 10 according to the present embodiment.

FIG. 1 shows an example of a projection system 10 according to the present embodiment. In the projection system 10, a projection image is output from the vicinity of an observer, and the output projection image is retro-reflected to be observed by the observer. The projection system 10 includes a projection apparatus 100 and a retro-reflective element 190.

The projection apparatus 100 outputs the projection image toward the retro-reflective element 190. The projection apparatus 100 includes an image generating unit 110, a projection unit 120, a retardation plate 130 and a reflective polarizing plate 140.

The image generating unit 110 generates image data of the projection image output by the projection apparatus 100. For example, the image generating unit 110 generates image data of an object or the like to be observed on the retro-reflective element 190 by a user. The image generating unit 110 may also read out image data stored on a storage device provided inside or outside the projection apparatus 100. The image generating unit 110 supplies the image data to the projection unit 120.

The projection unit 120 has a function to output a projection image associated with the image data generated by the image generating unit 110, and may be a small projector device, for example. The projection unit 120 may output a projection image that focuses at the position where the retro-reflective element 190 is arranged. The projection unit 120 may output a projection image with polarized light (for example, circularly polarized light).

The retardation plate 130 is arranged obliquely with respect to the optical axis of the projection image output by the projection unit 120, and modulates the polarization state of the projection image incident thereon. For example, the retardation plate 130 is arranged such that the normal to its principal plane and the optical axis of the projection image form an inclination angle α in a range of 30 to 60 degrees (for example, 45 degrees). If the position of the observer's eye is fixed, the projection unit 120 and the retardation plate 130 may be arranged positions such that the angle formed by the normal to the principal plane of the retardation plate 130 and the straight line connecting the retardation plate and the observer's eye coincides or substantially coincides with the inclination angle α as shown in FIG. 1.

The retardation plate 130 may be a quarter-wave plate. The retardation plate 130 may also be a retardation plate whose in-plane retardation and/or out-of-plane retardation is adjusted according to the inclination angle α such that polarized light incident from the projection unit 120 is output with its phase shifted by a quarter wavelength. The in-plane retardation and/or out-of-plane retardation varies according to the inclination angle α and the angle between the slow axis of the retardation plate 130 and the projection direction of incident light onto the principal plane of the retardation plate 130. Thus, the direction of the slow axis of the retardation plate 130 may be adjusted to obtain a phase shift of a quarter wavelength, and the transmission axis/reflection axis of a reflective polarizing plate 140, which will be described later, may be adjusted in conjunction.

The reflective polarizing plate 140 is stacked on the side of the retardation plate 130 opposite to that on which the projection image is incident, and reflects a first polarization component of the projection image transmitted through the retardation plate 130. In this manner, the reflective polarizing plate 140 projects the reflected projection image forward (for example, onto the retro-reflective element 190 provided forward thereof).

The reflective polarizing plate 140 transmits a second polarization component of the projection image reflected by the retro-reflective element 190 and further modulated by the retardation plate 130. The reflective polarizing plate 140 may be adhered or otherwise fixed on a surface of the retardation plate 130. For example, the reflective polarizing plate 140 may include a wire grid polarizer or multilayer polarizer.

The retro-reflective element 190 is provided along the direction in which the projection image from the projection unit 120 is reflected by the reflective polarizing plate 140, and outputs reflected light against the direction in which the light is incident. In this manner, the retro-reflective element 190 outputs the projection image incident from the reflective polarizing plate 140 toward the reflective polarizing plate 140. The projection image may or may not focus at a position forward of the reflective polarizing plate 140 (for example, at the position of the retro-reflective element 190).

If not, a mirror (for example, a concave mirror) may be provided instead of the retro-reflective element 190.

An example of the optical path of the projection image output from the projection unit 120 in FIG. 1 will now be described. First, the projection unit 120 outputs a projection image 1A with first circularly polarized light (for example, right-handed circularly polarized light). As used herein, right-handed circularly polarized light may refer to circularly polarized light whose rotation direction is right-handed (i.e., clockwise) as seen toward its output destination (for example, the retardation plate 130) from its output source (for example, the projection unit 120), and left-handed circularly polarized light may refer to circularly polarized light whose rotation direction is left-handed as seen toward its output destination from its output source. The projection image 1A output from the projection unit 120 is incident on the retardation plate 130 at an angle of incidence equal to the inclination angle α (for example, 45 degrees).

Then, the projection image 1A of the first circularly polarized light incident on the retardation plate 130 is modulated by the retardation plate 130 into first linearly polarized light (for example, S-polarized light), and is incident on the reflective polarizing plate 140. The reflective polarizing plate 140 reflects the projection image 1A, which has turned into the first linearly polarized light, at a reflection angle of a so that the projection image 1A is incident on the retardation plate 130 again. The retardation plate 130 modulates the reflected projection image 1A of the first linearly polarized light into a projection image 1B of the first circularly polarized light (for example, right-handed circularly polarized light), and outputs it toward the retro-reflective element 190.

Then, the retro-reflective element 190 receives the projection image 1B of the first circularly polarized light incident thereon, and reflects it against its incident direction with its polarization state maintained, so as to output a projection image 1C of second circularly polarized light, whose rotation direction is opposite to that of the first circularly polarized light, toward the retardation plate 130.

Then, the projection image 1C of the second circularly polarized light is incident on the retardation plate 130 again, is modulated by the retardation plate 130 into second linearly polarized light, whose oscillation direction is different from that of the first linearly polarized light (for example, P-polarized light), and is incident on the reflective polarizing plate 140. The reflective polarizing plate 140 transmits the projection image 1C of the second linearly polarized light, instead of reflecting it, so as to output a projection image 1D toward the observer.

As described above, in the projection system 10, a projection image output by the projection unit 120 is reflected by the retro-reflective element 190 toward the observer, and thus only the observer can observe the projection image. In this manner, the projection system 10 can display, on an object or screen, an image or the like of another object visible only to the observer in an overlaid manner, and thus can provide a virtual reality experience different from the actual view for the observer.

The projection system 10 can also provide a brighter projection image for the observer than in the case of using a half mirror, due to the combined use of the retardation plate 130 and the reflective polarizing plate 140. Therefore, the projection system 10 of the present embodiment can provide a brighter and clearer video image for the observer than in the conventional method.

Furthermore, with the projection system 10, the energy consumption required to display the projection image can be reduced and/or reducing the size of the projection unit 120 can reduce the size of the projection apparatus 100 itself. Moreover, with the projection system 10, the stacked arrangement of the retardation plate 130 and the reflective polarizing plate 140 can reduce the size of the projection apparatus 100.

Figure 2:
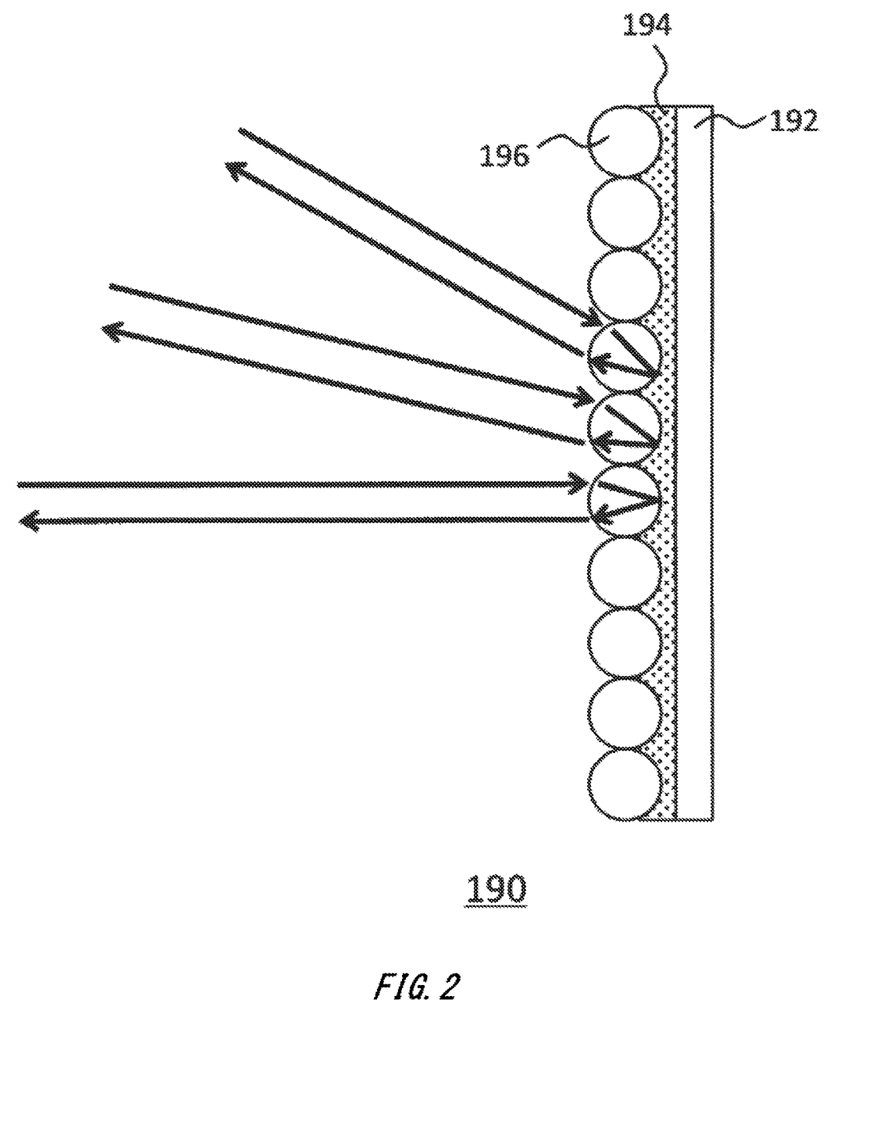
FIG. 2 shows an example of a retro-reflective element 190 in the present embodiment.

FIG. 2 shows an example of the retro-reflective element 190 in the present embodiment. The retro-reflective element 190 may have a base substrate 192, an adhesive layer 194 and reflective materials 196. The base substrate 192 is a member supporting the reflective materials 196, and may be a film, a sheet of paper, a woven fabric, a ceramic plate, a glass plate, a metal plate or the like, for example.

The adhesive layer 194 is a member fixing the reflective materials 196 to the base substrate 192, and may be a cured adhesive or the like, for example. The plurality of reflective materials 196 are provided on a surface of the base substrate 192, are each a member that refracts and reflects incident light to output reflected light in approximately the same direction as that of the incident light and may each be a spherical lens, a cylindrical lens, a corner cube, a prism or the like, for example.

While in FIG. 2 the retro-reflective element 190 has a planer shape as a whole, the retro-reflective element 190 may have a curved surface. The retro-reflective element 190 may also be a plate-shaped member having stiffness or a flexible member having flexibility. For example, the projection apparatus 100 outputs the background image of an object to the retro-reflective element 190 as a projection image, with the object covered with the retro-reflective element 190 in the form of a cloth with flexibility, so as to obtain a camouflage effect on the object.

Figure 3:
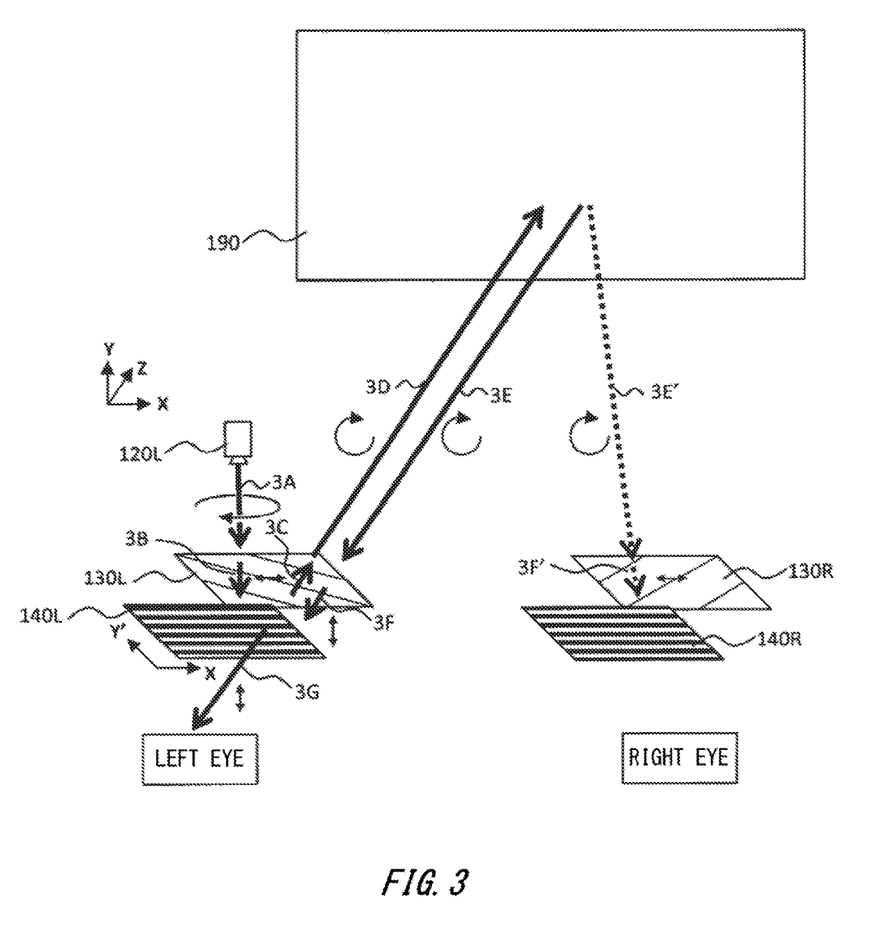
FIG. 3 shows an example of a three-dimensional image displaying method performed by a projection system 10 according to a first modified example of the present embodiment.
Figure 4:
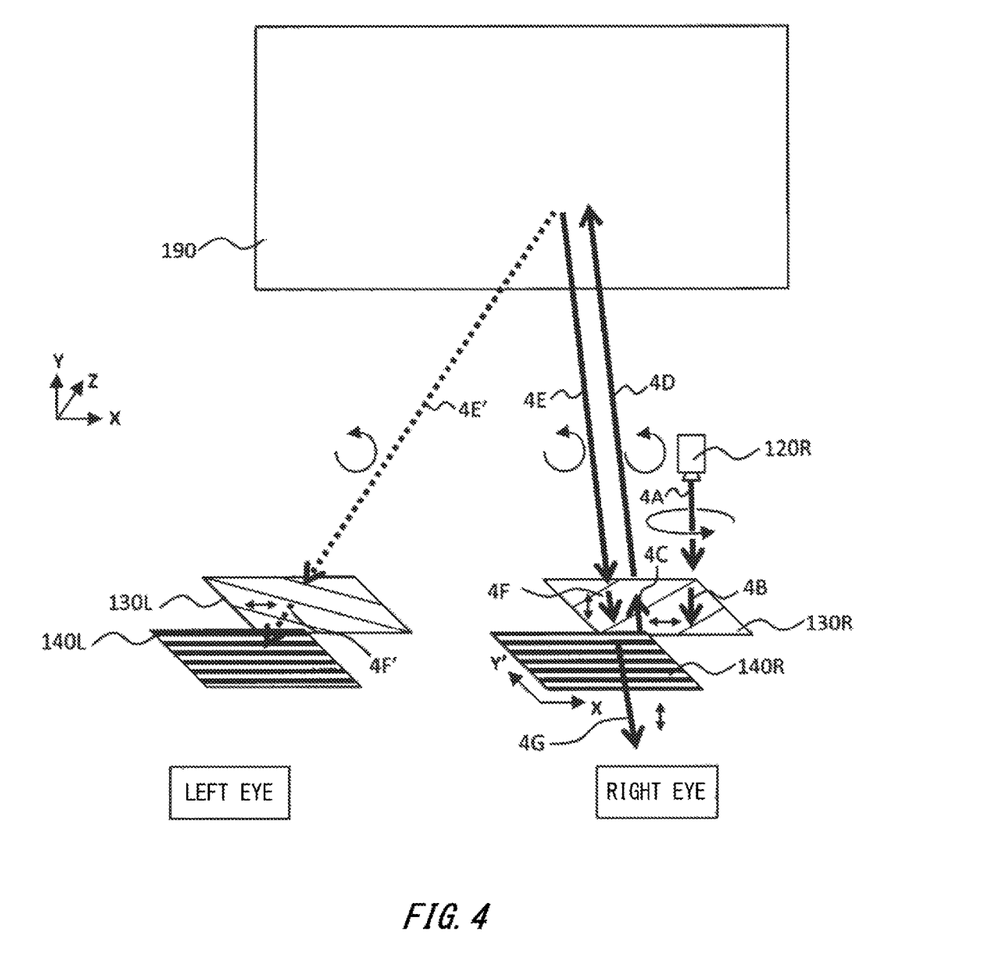
FIG. 4 shows an example of the three-dimensional image displaying method performed by the projection system 10 according to the first modified example of the present embodiment.

FIG. 3 and FIG. 4 show an example of a three-dimensional image displaying method performed by a projection system 10 according to a first modified example of the present embodiment. In this modified example, the projection apparatus 100 includes pluralities of projection units 120 and retardation plates 130 at least, and the plurality of projection units 120 output a projection image for left eye and a projection image for right eye, so that an observer observes a three-dimensional image.

FIG. 3 shows an example of the optical path and polarization state of the projection image for left eye. For example, a projection unit 120L for left eye first outputs a projection image 3A for left eye toward a retardation plate 130L for left eye, provided forward in the negative Y direction. The projection unit 120L outputs right-handed circularly polarized light as the projection image 3A.

The retardation plate 130L may be a quarter-wave plate provided in a plane that is rotated, with respect to a plane with its normal along the optical axis of the projection image 3A, by 45 degrees around the X axis orthogonal to the Y direction. Y' axis is defined herein as an axis that is orthogonal to the X axis in the principal plane of the retardation plate 130L. The retardation plate 130L may have a slow axis inclined by 45 degrees with respect to the X direction in the X-Y' plane, and modulates the projection image 3A incident on the retardation plate 130L into a projection image 3B of linearly polarized light oscillating in the X direction and outputs it toward a reflective polarizing plate 140L.

The reflective polarizing plate 140L is provided in a stacked manner on the retardation plate 130L, and may be a wire grid polarizer with a plurality of wires arranged in parallel with the positive and negative X directions. The reflective polarizing plate 140L reflects the projection image 3B, which is S-polarized light oscillating in the positive and negative X directions, in the positive Z direction orthogonal to the X direction and Y direction, so as to output a projection image 3C toward the retardation plate 130L.

Then, the retardation plate 130L modulates the projection image 3C, incident thereon after being reflected by the reflective polarizing plate 140L, into a projection image 3D of right-handed circularly polarized light, and outputs it in the positive Z direction toward the retro-reflective element 190.

Then, the retro-reflective element 190 reflects the projection image 3D incident thereon against its incident direction with its polarization state maintained, so as to output a projection image 3E of left-handed circularly polarized light in the negative Z direction toward the retardation plate 130L. Note that the retro-reflective element 190 may reflect part of the projection image 3D in a direction other than the incident direction due to scattering or the like. For example, the retro-reflective element 190 outputs a projection image 3E' of left-handed circularly polarized light that is part of the reflected light of the projection image 3D in a direction toward a retardation plate 130R for right eye.

The retardation plate 130L modulates the projection image 3E incident thereon into a projection image 3F of linearly polarized light oscillating in the positive and negative Y directions in the plane of the retardation plate 130L, and outputs it toward the reflective polarizing plate 140L. The reflective polarizing plate 140L transmits the projection image 3F, which is P-polarized light oscillating in the positive and negative Y directions, toward the observer's left eye, so that the observer's left eye observes the projection image for left eye.

On the other hand, the retardation plate 130R is provided in parallel with the retardation plate 130L, and may be a quarter-wave plate having a slow axis orthogonal to that of the retardation plate 130L. The retardation plate 130R modulates the projection image 3E' incident thereon into a projection image 3F' of linearly polarized light oscillating in the positive and negative X directions, and outputs it toward the reflective polarizing plate 140R.

The reflective polarizing plate 140R is in parallel with the reflective polarizing plate 140L, and its transmission axis and reflection axis are provided in the same direction as those of the reflective polarizing plate 140L. The reflective polarizing plate 140R reflects the projection image 3F', which is S-polarized light oscillating in the positive and negative X directions, instead of transmitting it. In this manner, the reflective polarizing plate 140R prevents the projection image for left eye from being incident to the observer's right eye, thereby preventing crosstalk.

FIG. 4 shows an example of the optical path and polarization state of the projection image for right eye. For example, a projection unit 120R for right eye first outputs a projection image 4A for right eye toward a retardation plate 130R for right eye, provided forward thereof in the negative Y direction. The projection unit 120R outputs left-handed circularly polarized light, which is different from the projection image 3A, as a projection image 4A.

The retardation plate 130R may be provided in a plane parallel to the retardation plate 130L. The retardation plate 130R modulates the projection image 4A incident thereon into a projection image 4B of linearly polarized light oscillating in the X direction orthogonal to the Y direction, and outputs it toward the reflective polarizing plate 140R.

The reflective polarizing plate 140R is provided in a stacked manner on the retardation plate 130R, and may be a wire grid polarizer with a plurality of wires arranged in parallel with the positive and negative X directions. The reflective polarizing plate 140R and reflective polarizing plate 140L may be implemented by means of a single reflective polarizing plate, or may be implemented by means of a plurality of separate reflective polarizing plates. The reflective polarizing plate 140R reflects the projection image 4B, which is S-polarized light oscillating in the positive and negative X directions, in the positive Z direction, so as to output a projection image 4C toward the retardation plate 130R.

Then, the retardation plate 130R modulates the projection image 4C incident thereon into a projection image 4D of left-handed circularly polarized light, and outputs it in the positive Z direction toward the retro-reflective element 190.

Then, the retro-reflective element 190 reflects the projection image 4D incident thereon against its incident direction with its polarization state maintained, so as to output a projection image 4E of right-handed circularly polarized light in the negative Z direction toward the retardation plate 130R. Note that the retro-reflective element 190 may reflect part of the projection image 4D in a direction other than the incident direction due to scattering or the like. For example, the retro-reflective element 190 outputs a projection image 4E' of right-handed circularly polarized light that is part of the reflected light of the projection image 4D in a direction toward the retardation plate 130L for left eye.

The retardation plate 130R modulates the projection image 4E incident thereon into a projection image 4F of linearly polarized light oscillating in the positive and negative Y directions, and outputs it toward the reflective polarizing plate 140R. The reflective polarizing plate 140R transmits the projection image 4F, which is P-polarized light oscillating in the positive and negative Y directions, toward the observer's right eye, so that the observer's right eye observes the projection image for right eye.

On the other hand, the retardation plate 130L modulates the projection image 4E' incident thereon into a projection image 4F' of linearly polarized light oscillating in the positive and negative X directions, and outputs it toward the reflective polarizing plate 140L. The reflective polarizing plate 140L reflects the projection image 4F', which is S-polarized light oscillating in the positive and negative X directions, instead of transmitting it. In this manner, the reflective polarizing plate 140L prevents the projection image for right eye from being incident to the observer's left eye, thereby preventing crosstalk.

As described above, in the projection system 10 of this modified example, the projection image for left eye and projection image for right eye can be displayed on the retro-reflective element 190 for the observer, to display a 3D image for the observer. In particular, this modified example uses the plurality of projection units 120L-R, which output projection images having different polarization directions, and the plurality of retardation plates 130L-R having orthogonal slow axes and the reflective polarizing plates 140L-R, which respectively receive the plurality of projection images incident from the plurality of projection units 120L-R, and thereby can reduce the loss of projected light, display the 3D image more efficiently, and reduce the occurrence of crosstalk in the 3D image.

Moreover, while the example of FIG. 3 and FIG. 4 shows the case where the reflective polarizing plate 140L for left eye and reflective polarizing plate 140R for right eye have parallel transmission axes and reflection axes and the retardation plate 130L for left eye and retardation plate 130R for right eye have orthogonal slow axes, alternatively the reflective polarizing plate 140L for left eye and reflective polarizing plate 140R for right eye may have orthogonal transmission axes and reflection axes and the retardation plate 130L for left eye and retardation plate 130R for right eye may have parallel slow axes.

Figure 5:
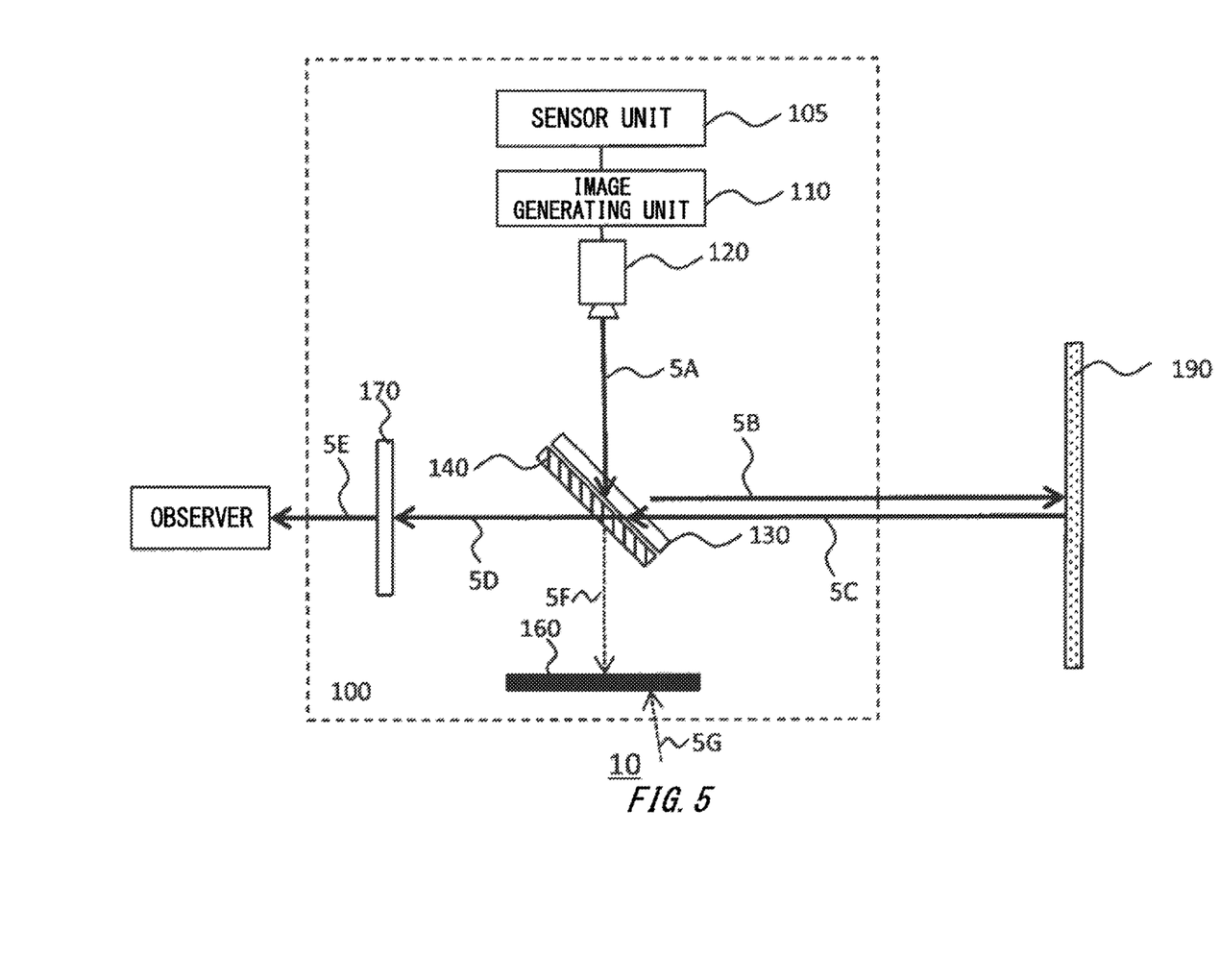
FIG. 5 shows an example of a projection system 10 according to a second modified example of the present embodiment.

FIG. 5 shows an example of a projection system 10 according to a second modified example of the present embodiment. In this modified example, the projection apparatus 100 further includes a sensor unit 105, a light-blocking member 160 and an absorptive polarizing plate 170.

The sensor unit 105 detects the position of an observer. For example, the sensor unit 105 may be a motion sensor to detect the position of the observer's head or eye. The sensor unit 105 supplies the detected position of the head or the like to the image generating unit 110.

The image generating unit 110 generates, based on a prestored background image behind the retro-reflective element 190, image data of the view of the background image to be observed from the position of the observer's head or the like if the retro-reflective element 190 were not present. The image generating unit 110 may generate image data of the views of the respective background images to be observed from the positions of the observer's left eye and right eye or the like.

The image generating unit 110 may generate image data of the view to be observed by the observer if a virtual object that is not present in reality were provided forward of the background image. The projection unit 120 outputs a projection image associated with the image data generated by the image generating unit 110.

The light-blocking member 160 is provided opposite to the projection unit 120 with respect to the reflective polarizing plate 140, and blocks light from the outside and/or absorbs light incident thereon. In this manner, the light-blocking member 160 absorbs noise light 5F, which is part of the projection image 5A output from the projection unit 120 and has been transmitted by the reflective polarizing plate 140 without being reflected, to prevent the noise light 5F from being reflected inside or outside the projection apparatus 100 to be observed by the observer. The light-blocking member 160 also blocks external light incoming from the outside, and thus can prevent the reflection of the floor or the like from being observed by the observer.

The absorptive polarizing plate 170 receives the projection image 5D incident thereon after being output from the retro-reflective element 190 and transmitted through the reflective polarizing plate 140, and has a transmission axis parallel to the transmission axis of the reflective polarizing plate 140 and an absorption axis parallel to the reflection axis of the reflective polarizing plate 140. In this manner, the absorptive polarizing plate 170 blocks light other than the projection image output from the projection unit 120 while allowing the projection image 5D output from the projection unit 120 to be observed by the observer, so that the observer observes the projection image with a smaller amount of noise. In particular, if the absorptive polarizing plate 170 is applied to the second modified example described with reference to FIG. 3 and FIG. 4, the projection image from the side of the other eye is further blocked, and therefore the projection apparatus 100 with further reduced crosstalk can be achieved.

Figure 6:
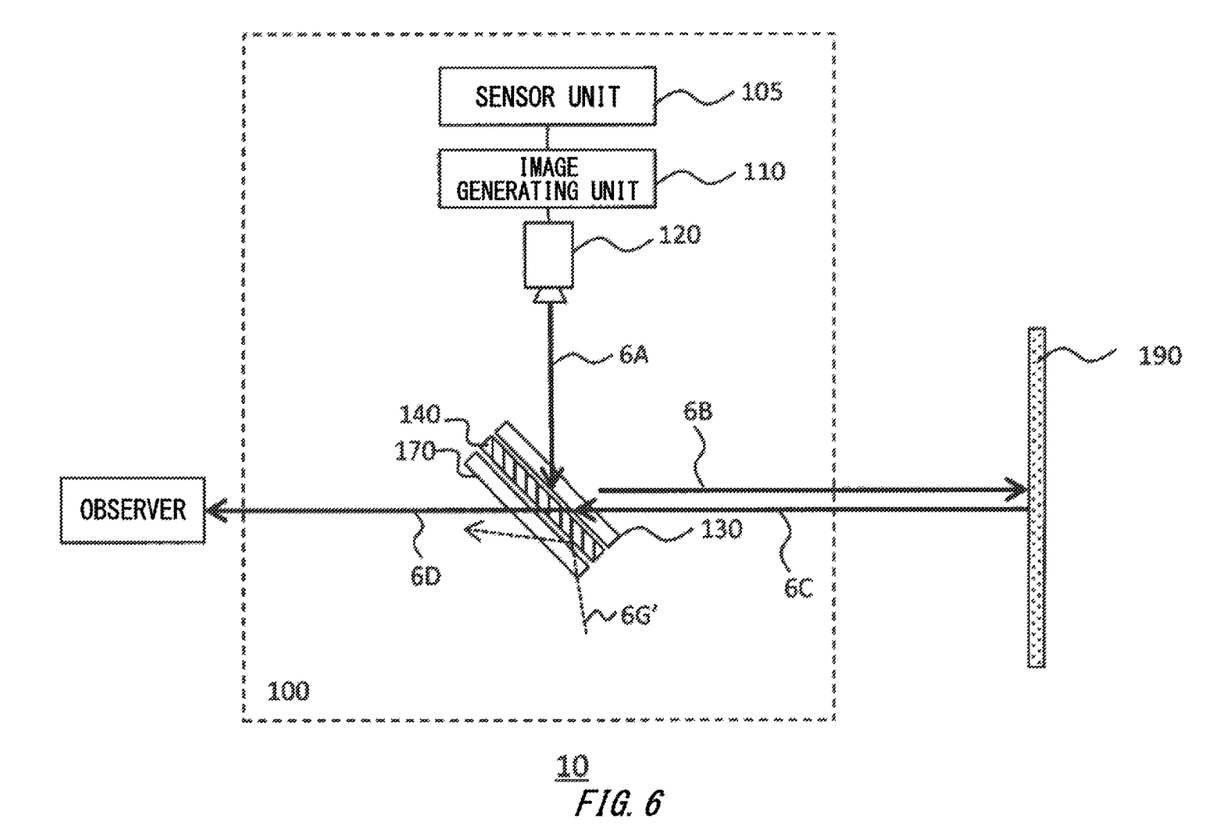
FIG. 6 shows an example of a projection system 10 according to a third modified example of the present embodiment.

FIG. 6 shows an example of a projection system 10 according to a third modified example of the present embodiment. In this modified example, the absorptive polarizing plate 170 is provided in a stacked manner on the side of the reflective polarizing plate 140 opposite to the retardation plate 130, instead of being arranged between the reflective polarizing plate 140 and the observer as shown in the second modified example. In this manner, if external light 6G' is incident from opposite to the projection unit 120 with respect to the reflective polarizing plate 140, the absorptive polarizing plate 170 absorbs a polarization component parallel to the reflection axis of the reflective polarizing plate 140, and thus the external light 6G' observed by the observer can be reduced.

Figure 7:
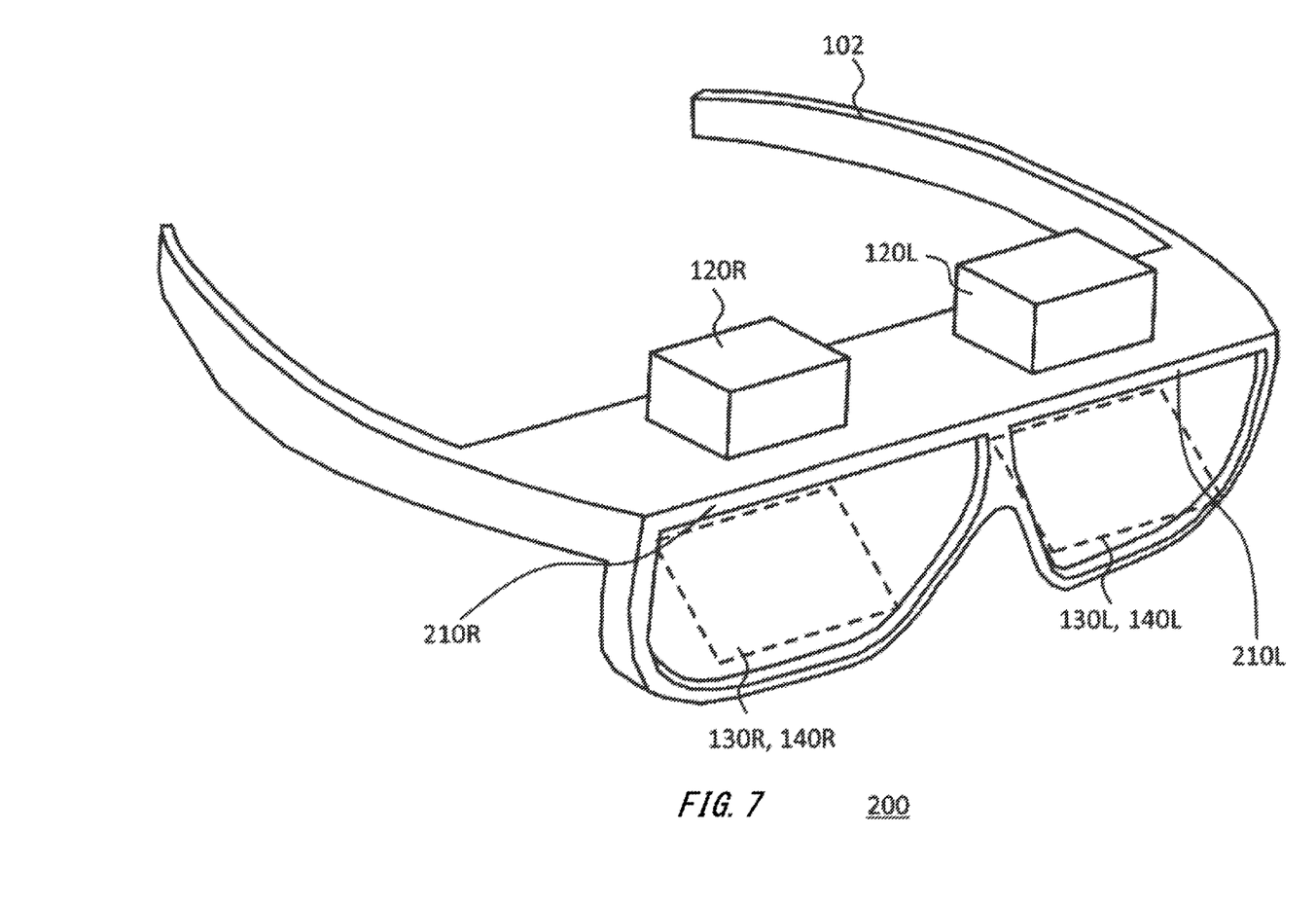
FIG. 7 shows an example of a spectacle-type display apparatus using a projection apparatus 100 of the present embodiment.

FIG. 7 shows an example of a spectacle-type display apparatus 200 using a projection apparatus 100 of the present embodiment. The spectacle-type display apparatus 200 includes a projection apparatus 100 and a spectacle-type frame 102, and may be worn by the observer in the same manner as spectacles by using the frame 102.

In this modified example, the spectacle-type display apparatus 200 may include a projection unit 120L and a projection unit 120R above the portions corresponding to the eye positions of spectacles, and the projection unit 120L and projection unit 120R may output projection images for left eye and right eye downward. A retardation plate 130L and a retardation plate 130R and a reflective polarizing plate 140L and a reflective polarizing plate 140R and the like may respectively be provided inside a rim 210R on the right-eye side and a rim 210L on the left-eye side of the spectacle-type display apparatus 200, to output the projection images output from the projection unit 120L and projection unit 120R forward of the wearer. The spectacle-type display apparatus 200 may further include other optics such as lenses.

In the spectacle-type display apparatus 200, the projection unit 120L and projection unit 120R may be provided at other portions. For example, in the spectacle-type display apparatus 200, the projection unit 120L and projection unit 120R may be provided below, inside or outside the portions corresponding to the eyes. Although not shown, the projection apparatus 100 and the spectacle-type display apparatus 200 may include the sensor unit 105, the image generating unit 110, and required components such as processors for controlling the projection unit 120 and the like and batteries for supplying them with electrical power.

Instead of the spectacle-type display apparatus 200 shown in FIG. 7, the projection apparatus 100 may be implemented by means of a helmet-type display apparatus, a head-mounted display, a mobile data terminal, a wearable terminal or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

When a plurality of elements are listed in the description of the embodiments, elements other than the listed elements may also be used. For example, when the description "X executes Y using A, B and C" appears, X may execute Y using D in addition to A, B and C.

EXPLANATION OF REFERENCES

10: projection system, 100: projection apparatus, 102: frame, 105: sensor unit, 110: image generating unit, 120: projection unit, 130: retardation plate, 140: reflective polarizing plate, 160: light-blocking member, 170: absorptive polarizing plate, 190: retro-reflective element, 192: base substrate, 194: adhesive layer, 196: reflective material, 200: spectacle-type display apparatus, 210: rim

What is claimed is:

1. A projection system comprising:
   a projection unit to output a projection image;
   a retardation plate arranged obliquely with respect to an optical axis of the projection image, the retardation plate to modulate a polarization state of the projection image incident thereon;
   a reflective polarizing plate stacked on a side of the retardation plate opposite to that on which the projection image is incident, the reflective polarizing plate to reflect a first polarization component of the projection image transmitted through the retardation plate;
   a retro-reflective element provided along a direction in which the projection image is reflected by the reflective polarizing plate, the retro-reflective element to output reflected light against a direction in which the light is incident; and
   an absorptive polarizing plate having a transmission axis parallel to a transmission axis of the reflective polarizing plate and stacked on a side of the reflective polarizing plate opposite to the retardation plate, the absorptive polarizing plate to receive the projection image incident thereon after being output from the retro-reflective element and transmitted through the reflective polarizing plate, wherein
   the reflective polarizing plate transmits a second polarization component of the projection image reflected by the retro-reflective element and modulated by the retardation plate.

2. The projection system according to claim 1, further comprising a light-blocking member provided on a side of the reflective polarizing plate opposite to the projection unit.

3. The projection system according to claim 1, wherein the projection unit outputs circularly polarized light, and the retardation plate is a quarter-wave plate.

4. The projection system according to claim 2, wherein the projection unit outputs circularly polarized light, and the retardation plate is a quarter-wave plate.

5. The projection system according to claim 1, comprising a plurality of projection units and a plurality of retardation plates, wherein
   the plurality of retardation plates have orthogonal slow axes and receive a plurality of projection images incident thereon from the plurality of projection units.

6. The projection system according to claim 2, comprising a plurality of projection units and a plurality of retardation plates, wherein
   the plurality of retardation plates have orthogonal slow axes and receive a plurality of projection images incident thereon from the plurality of projection units.

7. The projection system according to claim 3, comprising a plurality of projection units and a plurality of retardation plates, wherein
   the plurality of retardation plates have orthogonal slow axes and receive a plurality of projection images incident thereon from the plurality of projection units.

8. The projection system according to claim 4, comprising a plurality of projection units and a plurality of retardation plates, wherein the plurality of retardation plates have orthogonal slow axes and receive a plurality of projection images incident thereon from the plurality of projection units.

9. A projection apparatus comprising:

a projection unit to output a projection image;

a retardation plate arranged obliquely with respect to an optical axis of the projection image, the retardation plate to modulate a polarization state of the projection image incident thereon;

a reflective polarizing plate stacked on a side of the retardation plate opposite to that on which the projection image is incident, the reflective polarizing plate to reflect a first polarization component of the projection image transmitted through the retardation plate for projection on a retro-reflective element provided forward; and an absorptive polarizing plate having a transmission axis parallel to a transmission axis of the reflective polarizing plate and stacked on a side of the reflective polarizing plate opposite to the retardation plate, the absorptive polarizing plate to receive the projection image incident thereon after being output from the retro-reflective element and transmitted through the reflective polarizing plate, wherein the reflective polarizing plate transmits a second polarization component of the projection image reflected by the retro-reflective element and modulated by the retardation plate.

10. The projection apparatus according to claim 9, further comprising a light-blocking member provided on a side of the reflective polarizing plate opposite to the projection unit.

11. The projection apparatus according to claim 9, wherein the projection unit outputs circularly polarized light, and the retardation plate is a quarter-wave plate.

12. The projection apparatus according to claim 9, comprising a plurality of projection units and a plurality of retardation plates, wherein the plurality of retardation plates have orthogonal slow axes and receive a plurality of projection images incident thereon from the plurality of projection units.

13. A spectacle-type display apparatus comprising the projection apparatus according to claim 9.

14. The spectacle-type display apparatus according to claim 13, wherein the projection unit is provided above a position of an eye.

15. A projection apparatus comprising:

a projection unit to output a projection image;

a retardation plate arranged obliquely with respect to an optical axis of the projection image, the retardation plate to modulate a polarization state of the projection image incident thereon;

a reflective polarizing plate stacked on a side of the retardation plate opposite to that on which the projection image is incident, the reflective polarizing plate to reflect a first polarization component of the projection image transmitted through the retardation plate for projection toward a forward position; and an absorptive polarizing plate having a transmission axis parallel to a transmission axis of the reflective polarizing plate and stacked on a side of the reflective polarizing plate opposite to the retardation plate, the absorptive polarizing plate to receive the projection image incident thereon after being output from the forward position and transmitted through the reflective polarizing plate, wherein the reflective polarizing plate transmits a second polarization component of the projection image reflected at the forward position and modulated by the retardation plate, and the projection image focuses at the forward position or does not focus at the forward position.

16. The projection apparatus according to claim 15, further comprising a light-blocking member provided on a side of the reflective polarizing plate opposite to the projection unit.

17. The projection apparatus according to claim 15, wherein the projection unit outputs circularly polarized light, and the retardation plate is a quarter-wave plate.

18. The projection apparatus according to claim 15, comprising a plurality of projection units and a plurality of retardation plates, wherein the plurality of retardation plates have orthogonal slow axes and receive a plurality of projection images incident thereon from the plurality of projection units.

19. A spectacle-type display apparatus comprising the projection apparatus according to claim 15.

20. The spectacle-type display apparatus according to claim 19, wherein the projection unit is provided above a position of an eye.

* * * * *